W. SCHWERING.
NUT LOCK.
APPLICATION FILED DEC. 26, 1908.

918,778.

Patented Apr. 20, 1909.

Witnesses
M. C. Lyddane
J. J. L. Mulhall

Inventor
William Schwering

By Joshua R. H. Potts
Attorney

UNITED STATES PATENT OFFICE.

WILLIAM SCHWERING, OF PHILADELPHIA, PENNSYLVANIA.

NUT-LOCK.

No. 918,778.     Specification of Letters Patent.     Patented April 20, 1909.

Application filed December 26, 1908. Serial No. 469,363.

*To all whom it may concern:*

Be it known that I, WILLIAM SCHWERING, a citizen of the United States, residing at Philadelphia, in the county of Philadelphia and State of Pennsylvania, have invented certain new and useful Improvements in Nut-Locks, of which the following is a specification.

My invention relates to improvements in nut locks, more particularly designed for use in connection with bolts and nuts for securing the fish plates at the joints of railroad rails, the object of the invention being to provide a construction of nut lock which can be readily attached, which will absolutely prevent any possibility of the nut turning on the bolt, and which can be quickly removed when desired.

With these objects in view, the invention consists in certain novel features of construction, and combinations, and arrangement of parts as will be more fully hereinafter described and pointed out in the claim.

Figure 1:
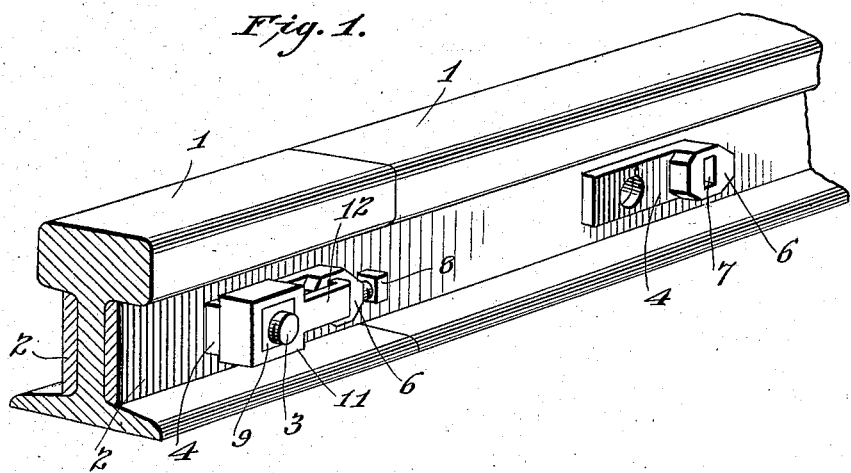
Figure 2:
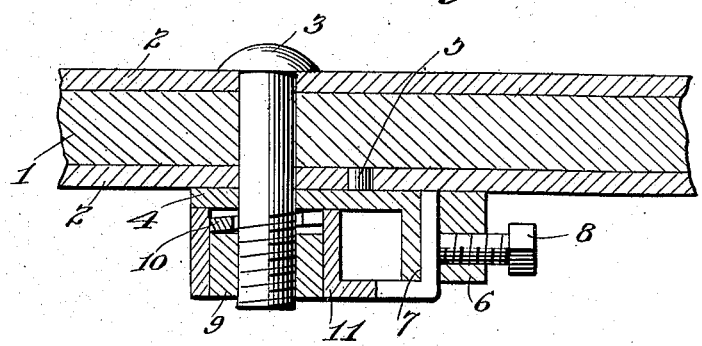
Figure 3:
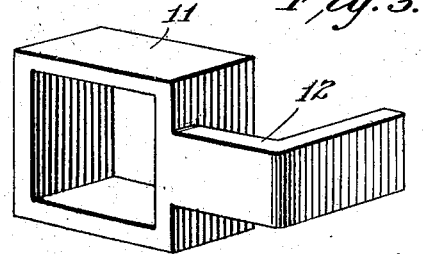

In the accompanying drawings, Figure 1, is a view illustrating my improvements applied to a rail joint. Fig. 2, is a similar view in horizontal section, and Fig. 3, is a detail perspective view of the nut securing housing.

1, 1, represent railroad rails, 2 fish plates at the opposite sides thereof, and 3 a bolt passing through one of said rails and through the fish plates.

4 represents a bar, disposed longitudinally against a fish plate 2, provided with an opening to receive the bolt 3, and preferably made with a lug 5 to enter an opening in the fish plate, and prevent any possibility of rotary movement of the bar 4. This bar 4 is provided with an integral post 6 having a recess 7, and a set screw 8 is screwed into said post, and its inner end projects into the recess 7, for a purpose which will hereinafter appear.

An ordinary nut 9 is screwed onto the end of bolt 3, and a split washer 10 is preferably interposed between the nut 9 and the bar 4.

11 represents my improved housing, which is preferably of rectangular form, and of slightly less internal area than is nut 9, so as to fit snugly thereon, and this housing is provided with an angle arm 12, adapted to be projected into the recess 7 in the post 6, and be securely locked by means of the set screw 8. It will thus be observed that when the housing is in position on the nut and the arm 12 secured in the post 6, it will be utterly impossible for the nut 9 to turn, the housing can be quickly removed by loosening the set screw 8, and can be quickly replaced when the nut is again tightened.

The split washer 10 may of course be dispensed with, as the nut 9 would be locked without the same.

Slight changes might be made in the general form and arrangement of parts described, without departing from my invention, and hence I do not restrict myself to the precise details set forth, but consider myself at liberty to make such changes and alterations as fairly fall within the spirit and scope of my invention.

Having thus described my invention what I claim as new and desire to secure by Letters Patent is:

In combination with a railroad rail, fish plates thereon, and a bolt projected through said rail and fish plates, of a bar located against a fish plate, and having an opening to receive the bolt, a lug on said bar projected into an opening in a fish plate, a post on said bar having a recess therein, a nut on the bolt, a housing inclosing the nut, an angle arm on the housing located in the recess in the post, and a set screw in the post clamping said angle arm therein.

In testimony whereof I have signed my name to this specification in the presence of two subscribing witnesses.

WILLIAM SCHWERING.

Witnesses:
R. H. KRENKEL,
J. A. L. MULHALL.